United States Patent [19]

Masumoto

[11] Patent Number: 4,837,639
[45] Date of Patent: Jun. 6, 1989

[54] CONTROL SIGNAL EXTRACTION IN A REPRODUCING APPARATUS

[75] Inventor: Yutaka Masumoto, Saitama, Japan

[73] Assignee: Pioneer Electronic Corporation, Tokyo, Japan

[21] Appl. No.: 70,469

[22] Filed: Jul. 7, 1987

[30] Foreign Application Priority Data

Jul. 7, 1986 [JP] Japan .................................. 61-160431

[51] Int. Cl.⁴ ........................ G11B 5/012; G11B 5/024
[52] U.S. Cl. ........................................ 360/27; 360/66
[58] Field of Search ...................... 360/27, 77, 66, 60, 360/67

[56] References Cited

U.S. PATENT DOCUMENTS 4,635,142  1/1987  Hougland .............................. 360/67

FOREIGN PATENT DOCUMENTS 61-22462  1/1986  Japan ..................................... 360/27

Primary Examiner—Alan Faber
Assistant Examiner—Kevin J. Fournier
Attorney, Agent, or Firm—Sughrue, Mion, Zinn, Macpeak & Seas

[57] ABSTRACT

A magnetic reproducing apparatus in which a synchronizing signal is read only if the signal of an erase signal at a set frequency is less than a predetermined level.

8 Claims, 5 Drawing Sheets

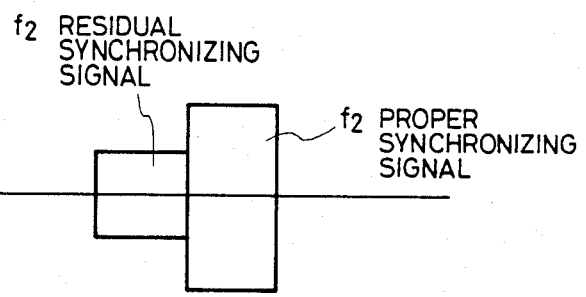
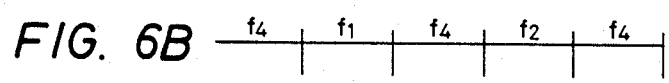

CONTROL SIGNAL EXTRACTION IN A REPRODUCING APPARATUS

BACKGROUND OF THE INVENTION

1. Field of the Invention

The present invention is generally related to a magnetic recording/reproducing apparatus. It particularly relates to a magnetic recording/reproducing apparatus of the type such as R-DAT.

BACKGROUND OF THE INVENTION

The R-DAT (rotary head-digital audio tape deck) which was standardized recently is arranged in such a manner that for the purpose of tracking a rotary magnetic head records on each inclined track pilot signals ($f_1$) and synchronizing signals ($f_2$, $f_3$) for detecting the pilot signal in accordance with a predetermined pattern as shown in FIG. 1. The level of a pilot signal (crosstalk component) is detected from a right adjacent track at a point in time of detection of a synchronizing signal and the level of a pilot signal (crosstalk component) is also detected from a left adjacent track at a point in time after a lapse of a predetermined time from the detection of that synchronizing signal. Then a tracking error signal is produced on the basis of a difference between those detected levels.

In order to detect such a synchronizing signal, for example, a device as shown in FIG. 2 has been considered. That is, a synchronizing signal having a pulse-coded pattern shown in FIG. 3A and recorded on a magnetic tape is reproduced by a rotary magnetic head 1 which traces an inclined track. The magnetic head 1 constitutes a sort of differentiation circuit which produces an output signal as shown in FIG. 3B. This output signal is applied to an integrating circuit 2 to be integrated by the integrating circuit 2 so as to be restored to a signal as shown in FIG. 3C. The restored signal is fed to a comparator 3 so as to be compared with a predetermined reference level (zero level) to thereby be waveshaped into such a signal as shown in FIG. 3D with its edges sharpened. The thus shaped signal is applied to a counter 4 acting as a read circuit so as to be counted by the counter. The counter 4 counts the number of the pulses of the input signal. When the count of the counter has reached a predetermined value (for example 20), the by the counter. The counter 4 counts the number of the that a synchronizing signal has been detected.

The device, however, has a problem in that the device is weak against a form of noise because the output signal of the magnetic head 1 is merely counted by the counter through the integrating circuit 2 and the comparing circuit 3. The above-mentioned pilot signal ($f_1$) and synchronizing signal ($f_2$, $f_3$) are erased by recording an erase signal ($f_4$) of a frequency higher than those of the pilot and synchronizing signals. However, for example, in the case of a system in which old information is erased by overwriting new information without providing an exclusive erase head, there is a defect in that the synchronizing signal which is the old information cannot be erased sufficiently because of its relatively low frequency. Therefore, the old synchronizing signal may be erroneously detected to make it impossible to perform correct tracking.

SUMMARY OF THE INVENTION

It is therefore an object of the present invention to eliminate drawbacks in the prior art.

It is a specific object to provide a magnetic recording/reproducing apparatus in which erroneous detection due to incomplete erasure or the like is prevented from occuring so that correct tracking control can be performed.

In order to attain the above objects, according to the present invention, the magnetic recording/reproducing apparatus comprises a magnetic head for reproducing a signal recorded on a magnetic medium, a read circuit for reading an output signal of the magnetic head, a separation circuit for separating a signal of a predetermined frequency from the output signal of the magnetic head, a detection circuit for detecting a level of an output signal of the separation circuit, and a control circuit for allowing the read circuit to perform its reading operation in accordance with an output signal of the detection circuit.

Thus, a signal of a predetermined frequency is separated of the output signal from the magnetic head. The level or the separated signal is detected so that, when the detected level is large, the reading of the output signal of the magnetic head is inhibited.

BRIEF DESCRIPTION OF THE PREFERRED EMBODIMENTS

Above and other objects, features and advantages of the present invention will appear more fully from the following description in conjunction with the accompanying drawings, in which:

FIGS. 5A–5F and 6A–6D are diagrams showing waveforms at various parts of the apparatus in FIG. 4.

DETAILED DESCRIPTION OF THE PREFERRED EMBODIMENTS

Figure 1:
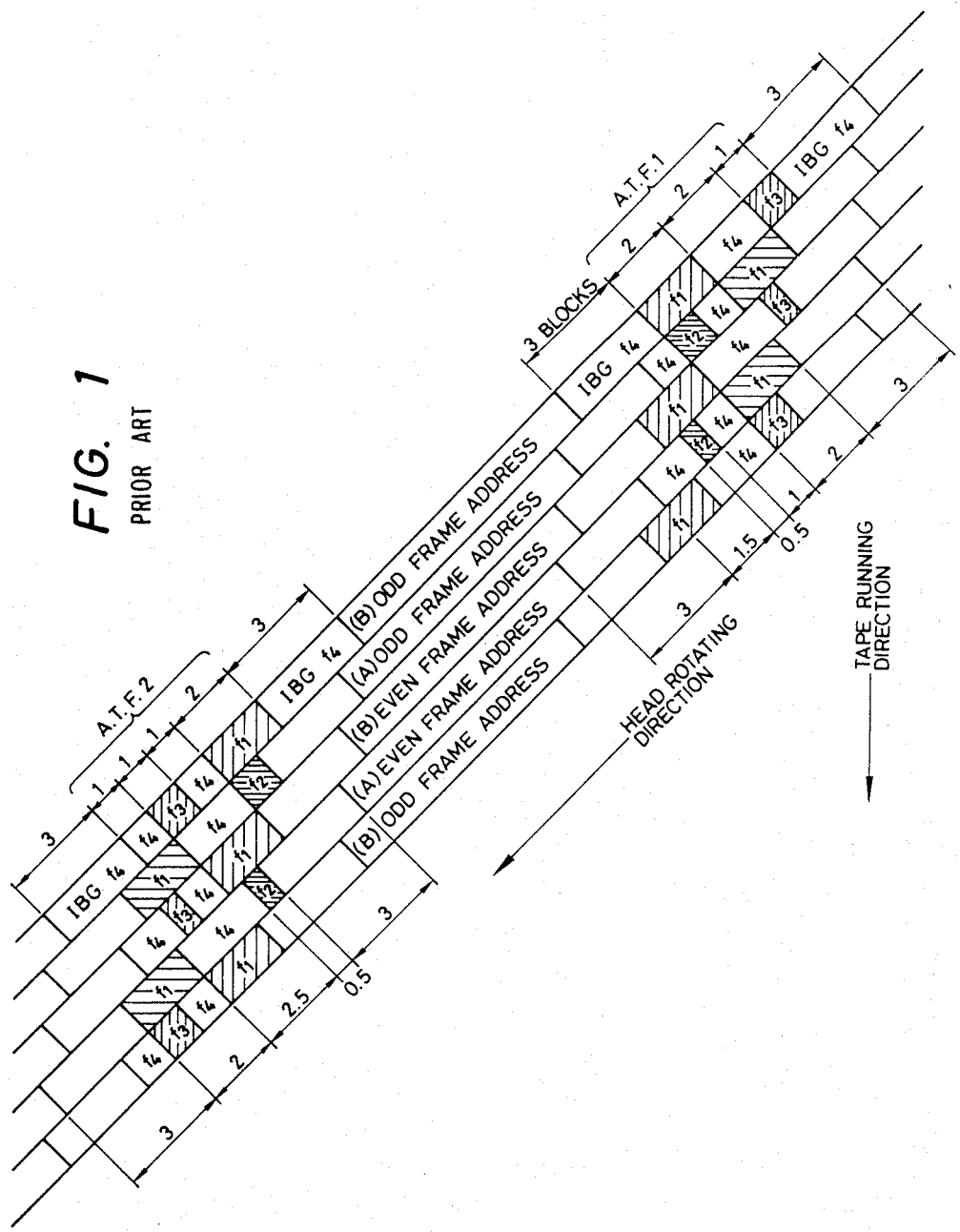
FIG. 1 is a diagram showing a tracking signal format for R-DAT.

Now, referring to the drawings, the present invention will be described more in detail hereunder.

Figure 2:
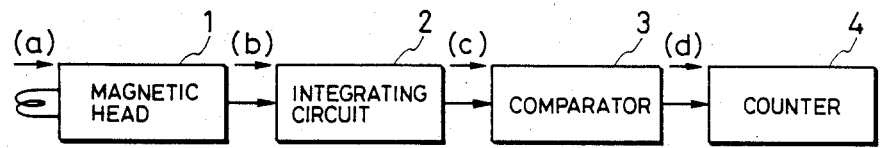
FIG. 2 is a block diagram of a conventional magnetic recording/reproducing apparatus.
Figure 4:
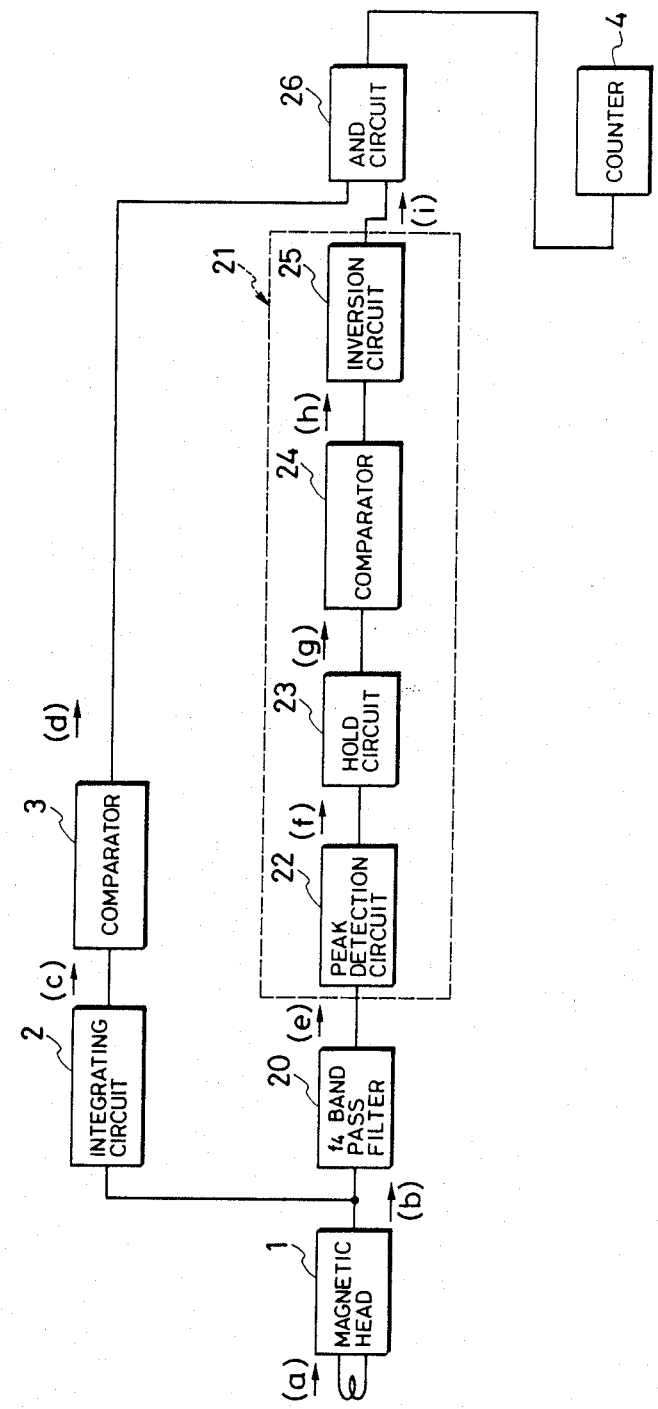
FIG. 4 is a block diagram of an embodiment of the magnetic recording/reproducing apparatus according to the present invention.

FIG. 4 is a block diagram of an embodiment of the magnetic recording/reproducing apparatus according to the present invention, in which items the same or equivalent to those in FIG. 2 are referenced correspondingly and their description is omitted here.

In FIG. 4, a band pass filter 20 is provided as a separation circuit so as to separate an erase signal ($f_4$) from an output signal of a magnetic head 1. A detection circuit 21 for detecting the level of the erase signal ($f_4$) is constituted by a peak detection circuit 22, a hold circuit 23, a comparator 24, and an inversion circuit 25. An AND circuit 26 is provided as a control circuit which transfers the output of a comparing circuit 3 to a counter 4 in accordance with the output of the detection circuit 21. The arrangement of the apparatus at other parts is the same as that in tne conventional apparatus of FIG. 2.

Figure 5A:
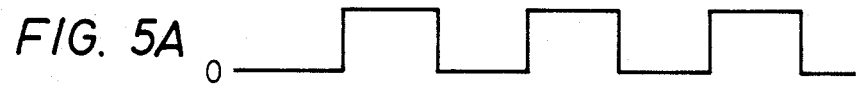
Figure 5B:
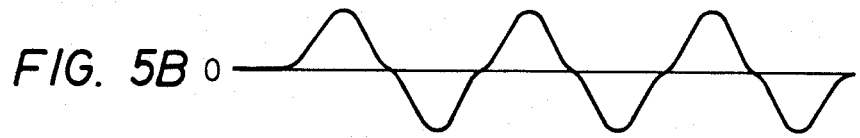
Figure 5E:
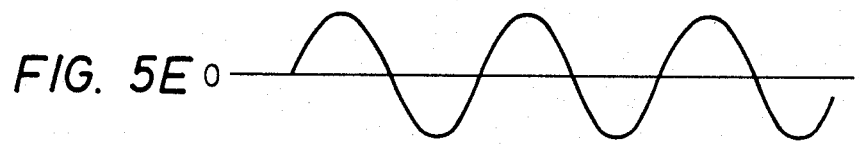
Figure 5F:
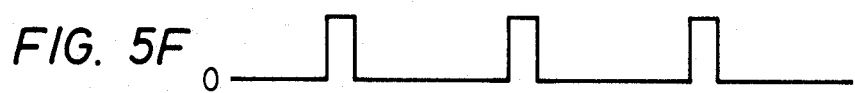
Figure 5G:
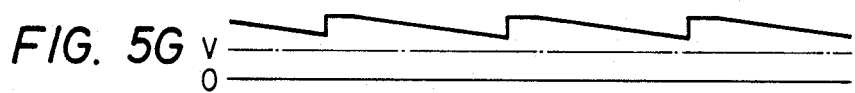
Figure 5H:
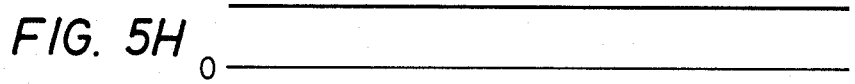
Figure 5I:
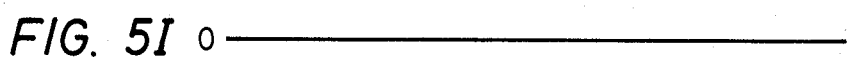

The operation of the apparatus of FIG. 4 is described in reference to FIGS. 5A–5I and 6A–6D. An erase signal (FIG. 5A) recorded on a magnetic tape is reproduced by the magnetic head 1. The reproduced signal (FIG. 5B) is fed to the band pass filter 20. Although the reproduced signal (FIG. 5B) includes other signal components due to crosstalk or the like, only the erase signal component is separated from the reproduced signal by the band pass filter 20 and produced therefrom as an output signal (FIG. 5E). The thus separated erase signal is fed to a peak detection circuit 22 so that a peak value of the erase signal is detected (FIG. 5F). The detected peak value is applied to a hold circuit 23 to be held therein (FIG. 5F). The held erase signal $f_4$ (FIG. 5G) at the output of the hold circuit 23 is applied to a comparing circuit 24 which compares the level of the erase signal with a reference level V, shown in FIG. 5G. The comparing circuit 24 produces an output signal (FIG. 5H) which has a high level when the level of the erase signal of FIG. 5G is higher that the reference level V while it has a low level when the level of the erase signal is lower than the reference level V. The reference level V corresponds to the minimum level for a valid erase signal. The output signal of the comparing circuit 24 is applied to an inversion circuit 25 so as to be logically inverted by the inversion circuit 25 (FIG. 5I). The inversion circuit 25 may be omitted, for example, by making the two inputs of the comparing circuit 24 to be of opposite polarity to each other.

Figure 3A:
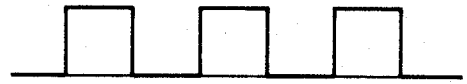
FIGS. 3A to 3D are diagrams showing waveforms at various parts of the apparatus of FIG. 4.
Figure 3B:
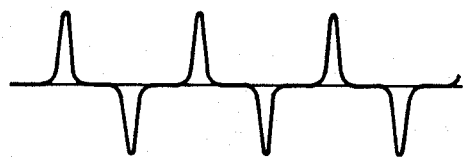
Figure 3C:
Figure 3D:
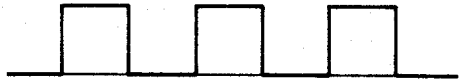

For example, assume now that a pattern of an erase signal $f_4$, a pilot signal $f_1$, an erase signal $f_4$, a synchronizing signal $f_2$, an erase signal $f_4$ has been sucessively recorded as shown in FIG. 6B and is then reproduced. At a position where an erase signal $f_4$ is located, the erase signal $f_4$ is detected to that the output (h) of the comparing circuit 24 and the output (i) of the inversion circuit 25 become as shown in FIGS. 6C and 6D respectively. Assume that a synchronizing signal $f_2$ (false synchronizing signal) has failed to be erased by an erase signal $f_4$ and which still exists in front of a proper synchronizing signal $f_2$ as shown in FIG. 6A. Then the residual synchronizing signal $f_2$ may be detected by the comprator 3 of the original circuit as described above (FIG. 3D). However, the output of the inversion circuit 25 has a low level at that time and therefore the AND circuit 26 is not enabled. Accordingly, the output of the comparing circuit 3 is not supplied to the counter 4.

On the contrary, no erase signal $f_4$ is located at a position where a proper synchronizing signal $f_2$ or $f_3$ has been recorded. Therefore, the AND circuit 26 is enabled at this time. Accordingly, as described above, the output of the magnetic head 1 is integrated by the integrating circuit 2, the output of the integrating circuit 2 is shaped by the comparing circuit 3, and the shaped signal is counted by the counter 4 through the AND circuit 26 so as to detect the synchronizing signal $f_2$ or $f_3$.

Thus, only one gating signal is fed to the AND circuit 26 in the arrangement of the aforementioned embodiment. However, the present invention is not limited to this but applicable to such a case where a false synchronizing signal can be detected in another arrangement. Another gating signal obtained in such an arrangement is fed to the AND circuit 26 so that the output of the comparator 3 can be controlled by two gating signals or more.

As described above, according to the present invention, the magnetic recording/reproducing apparatus comprises a magnetic head for reproducing a signal recorded on a magnetic medium, a read circuit for reading an output signal of the magnetic head, a separation circuit for separating a signal of a predetermined frequency from the output signal of the magnetic head, a detection circuit for detecting a level of an output signal of the separation circuit, and a control circuit for allowing the read circuit to perform its reading operation in accordance with an output signal of the detection circuit, so that erroneous detection due to insufficient erasing or the like can be prevented from occuring to thereby make it possible to perform correct tracking control.

What is claimed is:

1. A magnetic reproducing apparatus, comprising:
   a magnetic head for reproducing a signal recorded on a magnetic medium to produce an output signal;
   a read circuit for reading said output signal of said magnetic head;
   a separation circuit for separating a signal of a predetermined frequency from said output signal of said magnetic head;
   a detection circuit for detecting a level of an output signal of said separation circuit; and
   a control circuit for allowing said read circuit to perform its reading operation only when said detected level is less than a first reference level and inhibiting said read circuit when said detected level is greater than said reference level.

2. A magnetic reproducing apparatus as recited in claim 1, wherein said read circuit compares an input first signal to a second reference level and outputs a second signal only if said first signal exceeds said second reference level.

3. A magnetic reproducing apparatus as recited in claim 2, wherein said read circuit integrates said output signal of said magnetic head to obtain said first signal.

4. A magnetic reproducing apparatus as recited in claim 3, wherein said comparing and outputting operations of said read circuit comprise a binary wave shaping operation.

5. A magnetic reproducing apparatus as recited in claim 4, further comprising a counter receiving an output of said read circuit.

6. A method of reading a signal on a magnetic recording medium, comprising the steps of;
   extracting a component at a predetermined frequency from an output of a magnetic head picking up a signal recorded on a magnetic medium;
   detecting a peak level of said extracted component;
   comparing said peak level to a reference level;
   reading said output of said magnetic head and thereby providing an output only of said peak level is less than said reference level.

7. A method as recited in claim 6, wherein said reading step integrates said output signal of said magnetic head.

8. A magnetic reproducing apparatus as recited in claim 1, wherein said predetermined frequency is a frequency of an erase signal on said magnetic medium.

* * * * *